Sept. 30, 1958 L. M. ROBINSON 2,854,042
MOUNTING FOR CIRCULAR SAW BLADES
Filed June 11, 1956 3 Sheets-Sheet 1

INVENTOR.
Louis M. Robinson
BY
His Attorney

INVENTOR.
Louis M. Robinson

Sept. 30, 1958  L. M. ROBINSON  2,854,042
MOUNTING FOR CIRCULAR SAW BLADES
Filed June 11, 1956  3 Sheets-Sheet 3
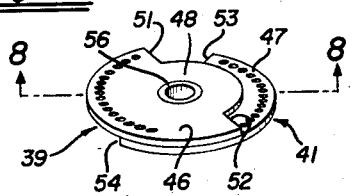
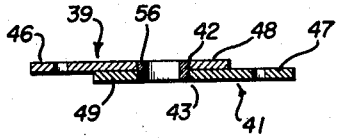
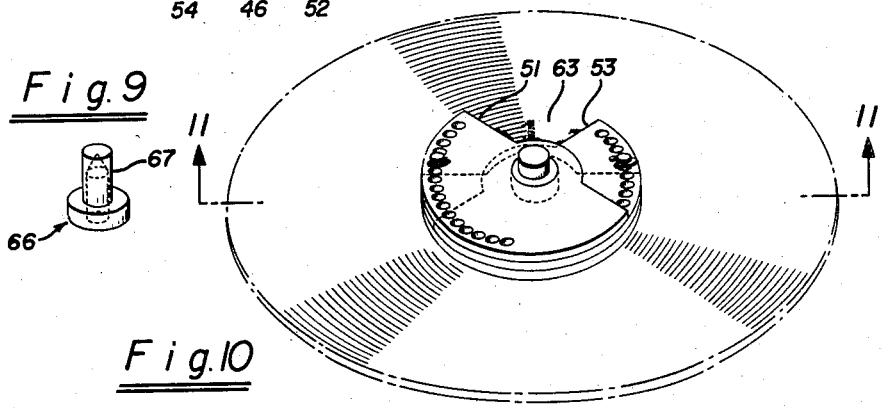
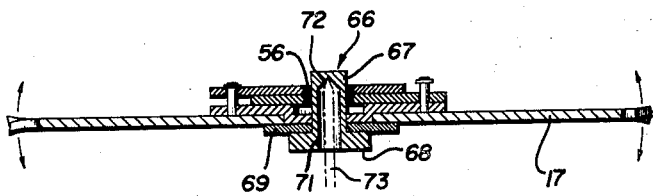
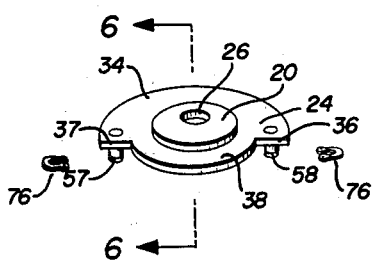
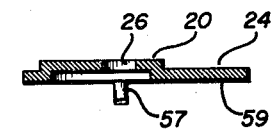
INVENTOR.
Louis M. Robinson
BY
His Attorney

United States Patent Office 2,854,042
Patented Sept. 30, 1958

2,854,042

MOUNTING FOR CIRCULAR SAW BLADES

Louis M. Robinson, Hayward, Calif., assignor to Saw Engineering, Inc., a corporation of California Application June 11, 1956, Serial No. 590,522

9 Claims. (Cl. 143—155)

The invention relates to circular saw machines and, more particularly, to the mounting of the saw blades thereof.

An object of the present invention is to provide a mounting of the character described which will increase the cutting capacity of the saw, thus affording greater work output with reduced power requirements, while at the same time improving the quality of the cutting action in providing smoother and straighter cuts.

Another object of the present invention is to provide a mounting of the character above which functions to confine the cutting section of the saw to a restricted peripheral portion of the saw blade teeth while reserving the balance of the teeth from cutting action and, when the cutting portion dulls, to provide successive adjustments of the saw on the mounting so as to bring successive sharp peripheral tooth sections into cutting action thereby greatly extending the effective life of the saw blade between sharpenings.

A further object of the present invention is to provide a mounting for a circular saw blade of the character above which enables the blade to run cooler than under conditions of conventional practice, whereby the saw blade teeth are less subject to overheating, annealing, softening and dulling.

Still another object of the present invention is to provide a mounting for a circular saw blade of the character described which may be used with standard saw machines without requiring any change-over or modification and for the cutting of a wide variety of materials such as wood, plastic, pressed fibreboard, and non-ferrous metals.

Still another object of the present invention is to provide a saw blade mounting of the above character which will afford added safety in virtually eliminating kickback of the work.

Yet another object of the present invention is to provide a saw blade mounting of the character described which is composed of a minimum number of sturdily formed parts well adapted for inexpensive mass production, and which will perform their intended function over a very long and useful life.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 5 (Sheet 3) is a perspective view of one of the parts of the mounting.

Figure 6 is a cross-sectional view of the part illustrated in Figure 5 and is taken substantially on the plane of line 6—6 of Figure 5.

Figure 7 is a perspective view of another of the parts of the mounting.

Figure 8 is a cross-sectional view of the part illustrated in Figure 7 and is taken substantially on the plane of line 8—8 of Figure 7.

Figure 9 is a perspective view of a part used for balancing the mounting and circular saw blade.

Figure 10 is a perspective view of the mounting and saw blade with the balancing part shown in Figure 9.

Figure 11 is a cross-sectional view of the parts shown in Figure 10.

Figure 1:
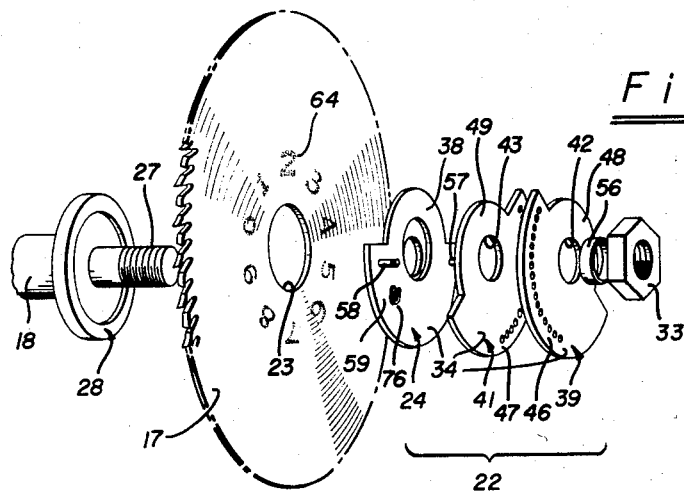
Figure 1 is an exploded perspective view of a saw blade mounting constructed in accordance with the present invention.
Figure 3:
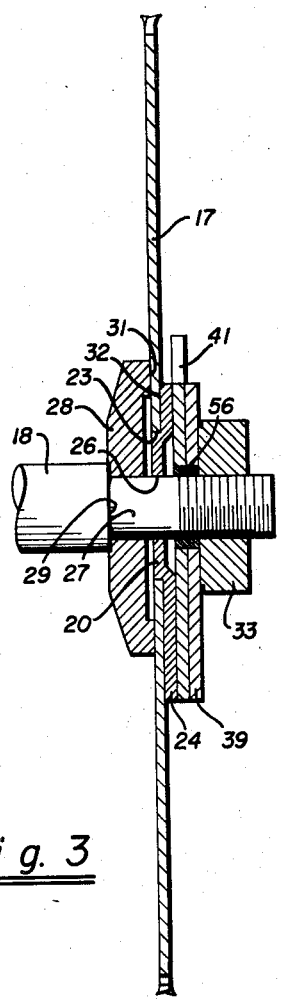
Figure 3 (Sheet 1) is a cross-sectional view of the assembly shown in Figure 2, and is taken substantially on the plane of line 3—3 of Figure 2.

The saw blade mounting of the present invention has as its principal feature the provision of an eccentric mounting 20 for a circular saw blade 17 on a power driven shaft 18 of a saw machine so as to cause engagement of the work 19 being cut of a restricted peripheral portion 21 of the saw blade, thus reserving the balance of the saw teeth from cutting action, the mounting 20 having the further special characteristic of permitting selective rotative positioning of the saw blade 17 thereon so that successive peripheral portions of the blade may, from time to time, be advanced for engagement with the work. As a further provision of the present invention means 22 is provided for counter-balancing the mounting member and saw blade so that smooth rotation is obtainable.

Figure 4:
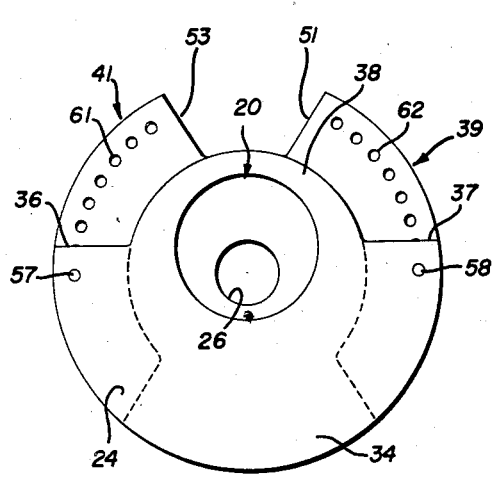
Figure 4 is a rear elevation of the mounting in assembled position of its parts but shown without the saw blade and removed from the shaft.
Figure 2:
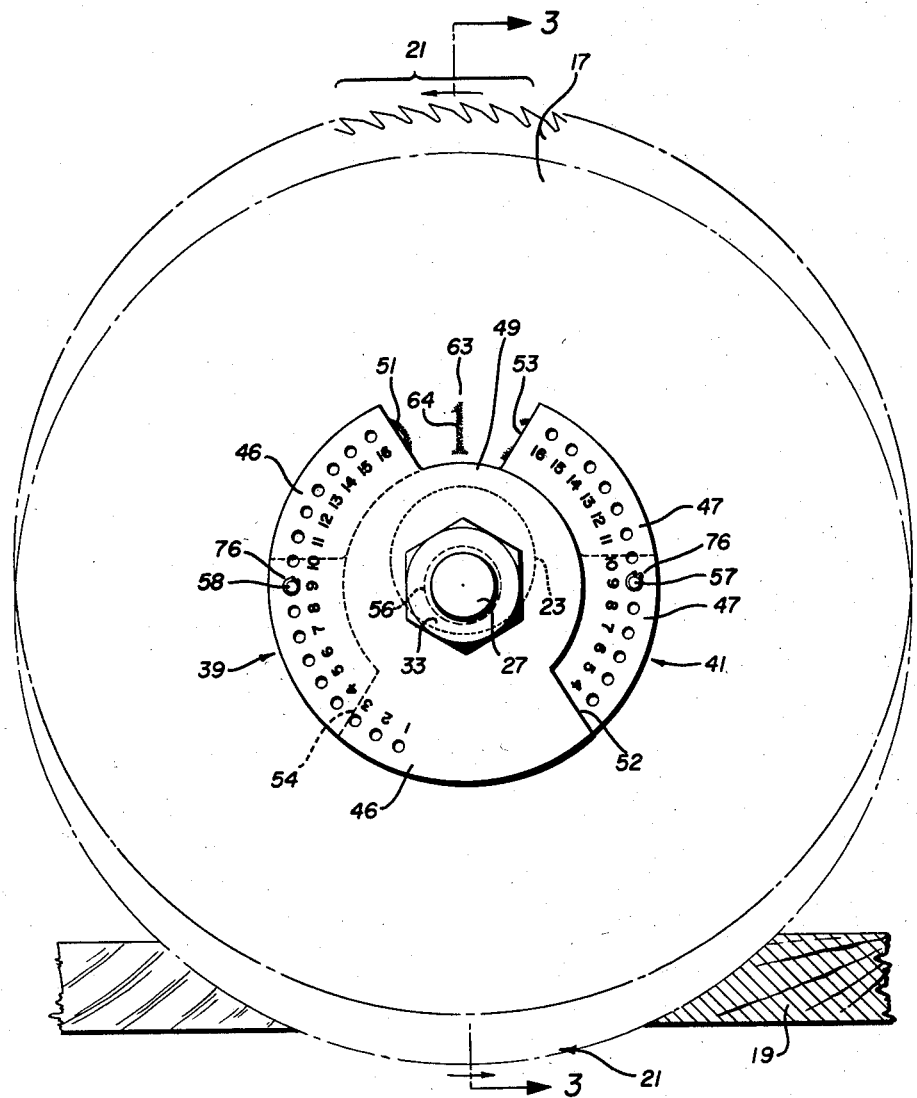
Figure 2 is a front elevation of the mounting shown operatively assembled on the saw machine shaft and with the saw blade in position for engagement with the work.

As will be best observed from Figures 3, 4, 5 and 6, the mounting 20 is here formed as an eccentric hub dimensioned for fitting into the central mounting opening 23 of the saw blade 17, the hub being formed as a boss or protuberance on a flat plate-like member 24 which is formed with an opening 26 arranged eccentrically in the hub 20 as seen in Figure 4, and dimensioned for mounting on the normally reduced and threaded end portion 27 of shaft 18, thus positioning blade 17 eccentric to shaft 18 as seen in Figure 2. The member 24 is mounted on shaft end 27 with the outwardly protruding hub 20 facing the conventional type saw supporting collar 28 normally provided on the reduced shaft end 27 against the shoulder 29 defining the inner end of the reduced shaft portion. Collar 28 is part of the saw machine. In this fashion, the inner portion of the saw blade 17 is engaged between the confronting surfaces 31 and 32 of the collar 28 and plate member 24. In order to obtain the desired eccentricity of the saw blade, preferably ⅛" to ¼", a relatively large center opening 23 in the saw blade is used. I have found that a blade opening and a corresponding hub diameter of approximately 1½" for a conventional 10" circular saw is quite satisfactory. The circular interfit of the hub 20 and saw blade opening 23 affords the rotatable positioning of the blade on the hub for advancing successive peripheral portions of the blade for engagement with the work. The blade may be held in each such selected position by a nut 33 threaded onto the outer end of shaft portion 27.

As a feature of the present construction the member 24 itself provides approximate counter-balancing of the saw blade 17. This is accomplished by forming the member 24, see Figures 5 and 6, with its center of mass eccentric to the shaft opening 26 on the opposite side from the center of the hub in counter-balancing relation to the eccentric mass of the saw blade. For convenience in manufacture and co-functioning with the other parts of the mounting, member 24 may be fashioned as seen in Figure 4 of a relatively enlarged substantially semi-circular portion 34 which provides the eccentric mass, and which is joined at its transversely extending ends 36 and 37 with a relatively reduced substantially semi-circular portion 38. The outer peripheries of portions 34 and 38 are here concentric to the axis of shaft opening 26 and, as will be observed from Figure 4, portion 34 is somewhat in excess of a half-circle.

In order to provide more perfect and precisely manually adjustable counter-balancing of the entire assembly, including the saw blade, a pair of additional counter-balancing members 39 and 41, see Figures 7 and 8, are provided for use in conjunction with the mounting for counter-balancing member 24. The members 39 and 41 are formed with openings 42 and 43 eccentric to their centers of mass, and which are dimensioned for mounting on shaft end 27 for rotatably positioning the members 39 and 41 about the shaft relative to each other and to the member 24 for counter-balancing the member 24 and the saw blade. Members 39 and 41 are here formed similarly to member 24 in that they are flat plate-like members having relatively enlarged substantially semi-circular portions 46 and 47 and relatively reduced substantially semi-circular portions 48 and 49 concentric to the shaft openings 42 and 43, the two semi-circular portions being joined in each instance with laterally extending edges 51 and 52 (in the case of member 39) and 53 and 54 (in the case of member 41).

For convenience in retaining the parts in assembled relation and in effecting rotative adjustment of the members 39 and 41 to their precise counter-balancing position, the latter members are here preferably mounted on a tubular bearing member 56 which journals the members for individual or joint rotation and is dimensioned for mounting on the shaft end 27. As will be observed, members 39 and 41 may be swung on the bearing 56 so as to dispose their enlarged portions 46 and 47 either opposite to the enlarged portion 34 of the first plate or in varying degrees eccentrically toward the portion 34 so as to provide any desired additive counter-balancing. By using a pair of members 39 and 41, the counter-balancing effect of one may be balanced by the counter-balancing effect of the other so that a perfectly balanced additive eccentric weight system is afforded. For example, the eccentric mass of member 24 will normally not quite counter-balance the eccentric mass of saw blade 17. Consequently, some additional eccentric mass, opposite to the center of mass of the saw blade, is provided by members 39 and 41. In the drawings, see Figures 2 and 4, member 24 is shown positioned with its center of mass directly under the center of rotation, member 39 is rotated to dispose its center of mass below and to the left of the center of rotation, and member 41 is rotated to position its center of mass in a symmetrical position below and to the right of the center of rotation, the two centers of mass of plates 39 and 41 thus being added in a balanced fashion to the center of mass of member 24.

Means is provided for securing members 39 and 41 in their relatively rotated counter-balanced position with member 24. As here shown, one or more pins 57 and 58 are carried by and project from side 59 of member 24 for engagement in a series of openings 61 and 62 formed in members 39 and 41 concentrically to the shaft opening for locking the three members in their selected rotated counter-balanced position. A total of sixteen openings, here shown numbered 1 to 16 in Figure 2, is provided in each of the series, the openings and their numbers being arranged to progressively add counter-balancing weight. In the arrangement shown, plates 39 and 41 are rotated to select opening No. 9 on the pins 57 and 58. Negative counter-balancing weight, that is in opposition to the counter-balancing weight of member 24, may be added in successive amounts by rotating the plates to engage openings 1 to 4. Openings 5 to 16 correspond to progressively increasing counter-balancing weight. To aid in holding together the assembly of plates, pins 57 and 58 may be formed with grooves at their outer ends for receipt of U-shaped spring clip members 76 which may be snapped into place so as to hold the plate assembly against axial separation.

As another feature of the present invention the mounting and counter-balancing means define a window 63, see Figure 2, and a suitable legend 64, here see Figure 1, numbers 0 to 9, is arranged concentrically to the center opening 23 of the saw blade in position for registration at the window 63 for indicating the selected rotated position of the saw blade on the hub 20. In the present construction, the window 63 is framed by the adjacent side edges 51 and 53 of members 39 and 41 and which are normally positioned in circumferentially spaced and generally outwardly extending position from the periphery of the reduced semi-circular portion 38 of member 24. In the arrangement of parts illustrated in the drawings, peripheral section 1 of the saw blade is positioned at the outer reach 21 of the rotating blade for engagement with the work. With the amount of eccentricity above discussed, and under normal operation of the saw, including normal feed rates of the work, the active cutting periphery of the saw blade is confined to approximately 10% of the periphery. The balance of the saw teeth are thus reserved and run freely through the saw cut merely aiding in cleaning out the chips cut by the active teeth. Consequently, in use, only this limited number of teeth will dull. When this happens, the nut 33 may be backed off and the saw blade 17 rotated on hub 20 so as to bring the next number, 2, into the window 63. The nut 33 is then retightened and operation may continue with freshly sharpened teeth engaging the work. In this fashion successive peripheral portions may from time to time be advanced until all of the saw periphery is used. Actually, it has been found from experience that a circular saw cuts best when a limited number of teeth are used, and the present invention thus provides means for selectively controlling the number of teeth which are used to cut at any one time and to shift the burden from section to section of the periphery of the saw. The present invention will thus greatly increase the cutting capacity of the conventional circular saw blade and afford a greater work output with reduced power requirements while, at the same time, improving the general quality of cutting action in providing smoother and straighter cuts.

Automatic advancing of the saw blade on its mounting when the active section dulls may be obtained by proper tightening of nut 33 so as to permit slipping of the saw blade in its mounting when the resistance to its rotation increases to a predetermined amount due to dulling of the cutting section.

The number of teeth used for active cutting is affected by the feed rate and advantage of this fact may be taken by the operator for different work conditions. For example, in cutting used lumber where nails may be encountered a slow feed rate may be used. In such case, the cutting action may be confined to but one or two teeth. Thus, as a nail is encountered, only this number of teeth are dulled and the saw may be reset to continue efficient operations.

As another feature of the present invention arising out of the restricted peripheral cutting section is the fact that the saw blade runs much cooler. Since only a small part of the periphery is heated by cutting action, the entire balance of the saw remains cool and pulls the heat rapidly out of the cutting section so that the active teeth are much less subject to overheating, annealing, softening or dulling. As a result, the teeth will remain sharper over a longer period of time.

As another feature of the eccentric motion of the saw blade, I have found that kick-back of the work is virtually impossible thus providing an important safety advantage in the use of the saw.

Balancing of the assembly may be facilitated by the provision of balancing cone member 66, see Figures 9 and 10, having a stem portion 67 dimensioned for extension through the aligned shaft opening 26 and tubular bearing 56 of the members, and an enlarged head 68 which may be positioned in underlying relation to the assembly in horizontal position as indicated in Figures 10 and 11 with a washer 69 mounted between the head 68 and the underside of the saw blade 17. A central bore 71 is formed in the member 66 which terminates at its upper end in an inverted cone 72 which may be rested upon the upper end of a pointed pin 73 such as a nail. In this position of the parts, plates 39 and 41 may be rotated to produce a level balanced condition of the entire assembly. Ordinary visual leveling has been found satisfactory to obtain dynamic balance.

I claim:

1. A mounting for a circular saw blade having a central opening comprising, a member having an opening for mounting on a power-driven saw shaft and formed with an eccentric hub dimensioned for fitting into the saw blade opening for mounting said blade eccentrically of said shaft so as to cause engagement with the work of a restricted peripheral portion of said blade, means counter-balancing said member and saw blade, said saw blade being rotatably positionable on said hub for positioning successive peripheral portions of said blade for engagement with the work, and means for holding said blade in selected rotated position on said hub.

2. A mounting for a circular saw blade having a central mounting opening comprising, a member having an opening for mounting on a power driven saw shaft and formed with an eccentric hub dimensioned for fitting into the saw blade opening for mounting said blade eccentrically of said shaft so as to cause engagement with the work of a restricted peripheral portion of said blade, said member being formed with its center of mass eccentric to said shaft opening on the opposite side from said hub in counter-balancing relation to the eccentric mass of the saw blade, said saw blade being rotatably positionable on said hub for positioning successive peripheral portions of said blade for engagement with the work, and means holding said blade in selected rotated position on said hub.

3. A mounting for a circular saw blade having a central mounting opening comprising, a first member having a portion dimensioned for fitting into said opening for mounting said saw blade and being formed with an eccentrically arranged opening dimensioned for mounting on a power driven saw shaft, second and third members each having an opening eccentric to its center of mass and dimensioned for mounting on said shaft and being rotatably positionable about said shaft relative to each other and to said first member for counter-balancing said first member and saw blade, and means securing said members in selected relatively rotated position for joint rotation with said saw blade.

4. A mounting for a circular saw blade having a central mounting opening comprising, a first member having an opening for mounting on a power driven saw shaft and formed with an eccentric hub dimensioned for fitting into the saw blade opening for mounting said blade eccentrically of said shaft so as to cause engagement with the work of a restricted peripheral portion of said blade, second and third members each having an opening eccentric to its center of mass and dimensioned for mounting on said shaft for relative rotative positioning on said shaft for counter-balancing said first member and saw blade, means securing said members in selected rotated counterbalanced position, said saw blade being rotatably positionable on said hub for positioning successive peripheral portions of said blade for engagement with the work, and means holding said blade in selected rotated position on said hub.

5. A mounting for a circular saw blade having a central mounting opening comprising, a first member having a portion adapted for fitting into said opening for mounting said blade and being formed with an eccentrically arranged opening for mounting on a power driven saw shaft, second and third members each having an opening eccentric to its center of mass and dimensioned for mounting on said shaft co-axially with said first member and being rotatably positionable about said shaft relative to each other and to said first member for counter-balancing said first member and saw blade, pins carried by said first member, said second and third members being each formed with a series of openings arranged concentrically to said shaft opening and engageable with said pins for securing said members in selected rotated counter-balanced position.

6. A circular saw blade having a central mounting opening comprising, a member providing an eccentric mounting for said opening on a power driven saw shaft so as to cause engagement with the work of a restricted peripheral portion of said saw blade, means counter-balancing said member and saw blade, said mounting permitting selective relatively rotated positioning of said blade thereon for positioning successive peripheral portions of said blade for engagement with the work, means holding said blade in selected rotated positions on said mounting, a window provided by said counter-balancing means, and a legend provided on said saw blade registerable at said window for indicating the selected rotated position of said blade on said mounting.

7. A circular saw blade having a central mounting opening, a first member having an opening for mounting on a power driven saw shaft and formed with an eccentric hub dimensioned for fitting into said saw blade opening for mounting said blade eccentrically of said shaft so as to cause engagement with the work of a restricted peripheral portion of said blade, second and third members each having an opening eccentric to its center of mass and dimensioned for mounting on said shaft for relative rotative positioning on said shaft for counter-balancing said first member and saw blade, means securing said members in selected rotated counter-balanced position, said saw blade being rotatably positionable on said hub for positioning successive peripheral portions of said blade for engagement with the work, means holding said blade in selected rotated position on said hub, said second and third members being formed to define a window between adjacent sides thereof, and a legend on said saw blade registerable at said window for indicating the selected rotated position of said blade on said hub.

8. In a mounting for a circular saw blade having a central mounting opening, a first member having an opening for mounting on a power driven saw shaft and formed with an eccentric hub dimensioned for fitting into said saw blade opening for mounting said blade eccentrically of said shaft so as to cause engagement with the work of a restricted peripheral portion of said blade, second and third members and a tubular bearing journaling said members and dimensioned for mounting on said shaft, said second and third members each having its center of mass eccentric to the axis of said bearing and being rotatably positionable on said bearing relative to each other and said first member for counter-balancing said first member and saw blade, and means for securing said members in a selected rotated counter-balanced position, said saw blade being rotatably adjustable on said hub for positioning successive peripheral portions of said blade for engagement with the work.

9. A circular saw blade having a central mounting opening, a first member having an opening for mounting on a power driven saw shaft and formed with an eccentric hub dimensioned for fitting into said saw blade opening for mounting said blade eccentrically of said shaft so as to cause engagement with the work of a restricted peripheral portion of said blade, said member being formed with its center of mass eccentric to said shaft opening on the opposite side from the center of said hub in counter-balancing relation to the eccentric mass of the saw blade, second and third members and a tubular bearing journaling said members and dimensioned for mounting on said shaft, said second and third members each having its center of mass eccentric to the axis of said bearing and being rotably positionable on said bearing relative to each other and said first member for counter-balancing said first member and saw blade, a pair of pins carried by said first member, said second and third members each being formed with a series of openings arranged concentrically to said bearing and engageable with said pins for securing said members in a selected rotated counter-balanced position, said saw blade being rotatably adjustable on said hub for positioning successive peripheral portions of said blade for engagement with the work, means holding said blade in selected rotated position on said hub, said second and third members being formed to define a window between adjacent sides thereof, and a legend on said saw blade registerable at said window for indicating the selected rotated position of said blade on said hub.

References Cited in the file of this patent

UNITED STATES PATENTS

| | | |
|---|---|---|
| 1,426,676 | Rudich | Aug. 22, 1922 |
| 2,239,317 | Gibb | Apr. 22, 1941 |

FOREIGN PATENTS

| | | |
|---|---|---|
| 172,082 | Germany | June 18, 1906 |